Feb. 18, 1969 R. B. CALDWELL 3,428,115
AUTOMOTIVE TEMPERATURE CONTROL
Filed Jan. 26, 1967 Sheet 1 of 6

INVENTOR.
ROLAND B. CALDWELL
BY
Yount, Raney, Flynn, and Tarolli
ATTORNEYS

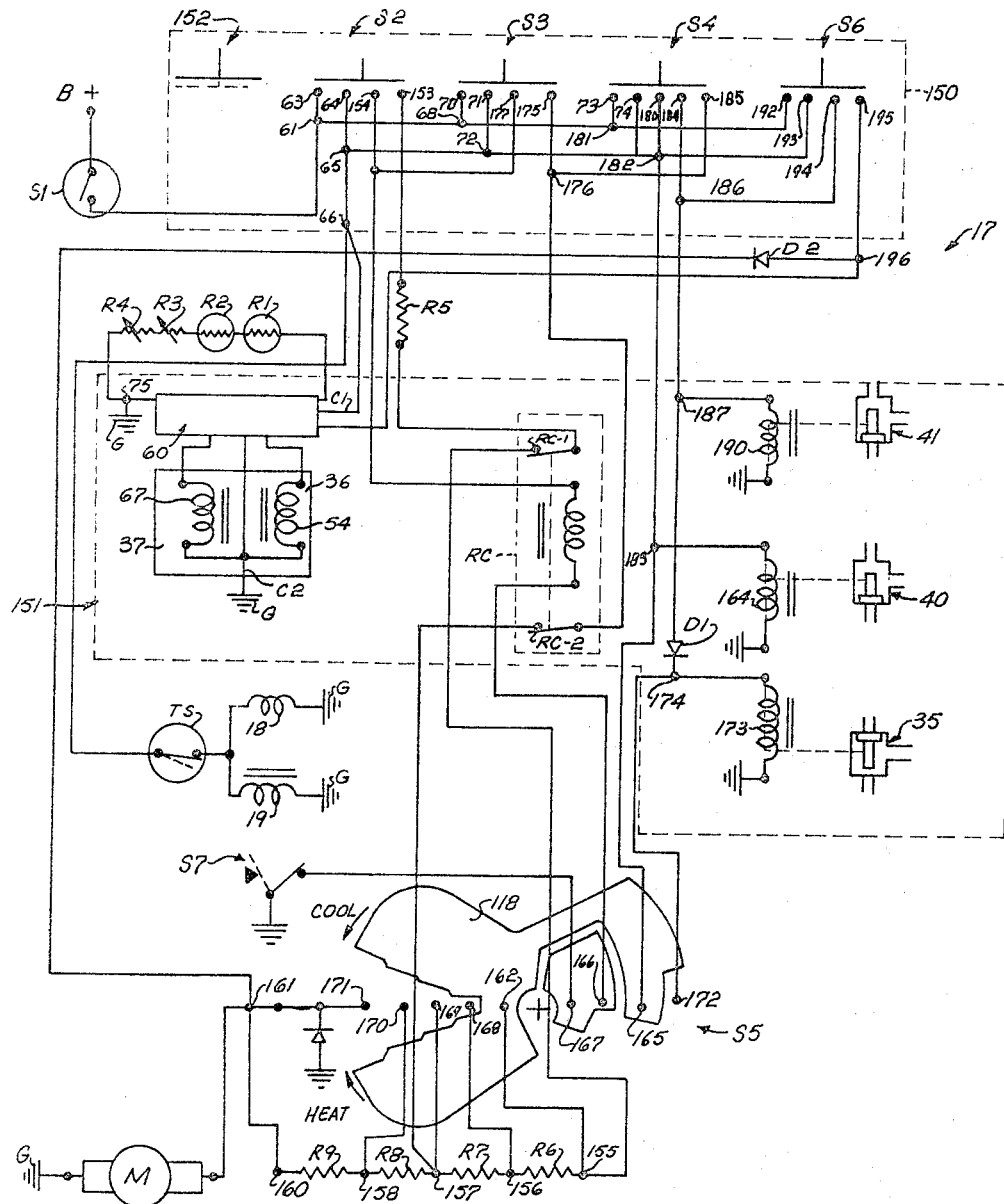
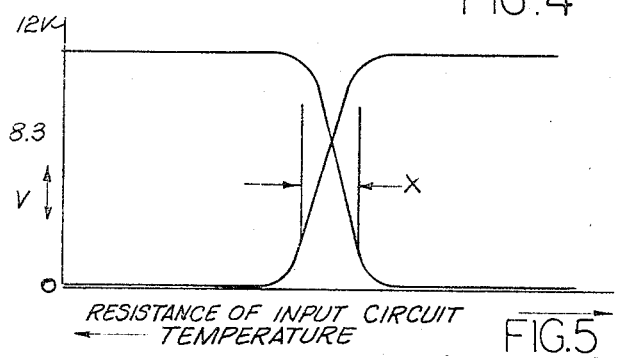
FIG.4
FIG.5
INVENTOR.
ROLAND B. CALDWELL
BY
ATTORNEYS

INVENTOR.
ROLAND B. CALDWELL
BY Yount, Ranty, Flynn, and Jaroli
ATTORNEYS

INVENTOR.
ROLAND B. CALDWELL
BY Yount, Ravey, Flynn, and Tarolli
ATTORNEYS

United States Patent Office 3,428,115
Patented Feb. 18, 1969

3,428,115
AUTOMOTIVE TEMPERATURE CONTROL
Roland B. Caldwell, Worthington, Ohio, assignor to Ranco Incorporated, Columbus, Ohio, a corporation of Ohio
Filed Jan. 26, 1967, Ser. No. 612,043
U.S. Cl. 165—23                            21 Claims
Int. Cl. B60h 3/04; G05d 23/13

ABSTRACT OF THE DISCLOSURE

A comfort temperature control system for an automotive vehicle including duct means having air heating and cooling heat exchangers for directing tempered air into the passenger compartment of the vehicle. A movable vane in the duct means proportions the flow of air through the heat exchangers to provide a variable-controlled amount of heat or cooling. Dampers control the flow path of air through the duct means and an apparatus controls the position of the vane-like member and the dampers and the speed of a blower so as to control the temperature and direction of air entering the compartment and which apparatus comprises a servo-unit having a pair of fluid motors individually operated to move the vane-like member and thereby vary the air flow across one of the heat exchangers.

BACKGROUND OF THE INVENTION

Field of the invention

The present invention relates to a temperature control system for a conditioned space and more particularly relates to a temperature control system having air heating and cooling structures and control apparatus for governing the heat transfer between air and the structures.

The prior art

Temperature control systems for air conditioned spaces such as the passenger compartment of automotive vehicles have been constructed so that air introduced into the passenger compartment is a mixture of heated and cooled air providing a desired temperature. In some systems the mixture of heated and cooled air determined by the position of a vane-like blend door which controls the proportion of the total air flow which is heated. In other cases the temperature of air introduced into the passenger compartment is controlled by positioning of a valve in a heater core. Such valves govern the flow of engine coolant in the heater core and thus control the heat transfer from the heater core to the air.

The positioning of the valve of the heater core or the blend door has been accomplished with the use of a fluid motor connected through suitable valving to a vacuum manifold of the vehicle engine. The vacuum pressure provides a source of motive pressure in the system. The fluid motor is usually provided with a regulated vacuum pressure governed by a temperature control apparatus. The pressure provided to the fluid motor determines the position of the blend door or heater core valve.

In addition to the noted apparatus these control systems also include dampers for controlling the flow path of air in ducting of the system. The dampers are often operated by fluid or vacuum motors.

These systems have generally been rather large and cumbersome assemblies employing many fluid conduits and considerable wiring. As a result of such constructions the control systems have been extremely difficult to service economically. Furthermore, the available space for such systems in an automobile is limited and prior art systems have required undesirably large volumes of space in the vehicle.

A further undesirable feature of such prior art systems resides in the construction of fluid motors for the valve or blend door. These motors consist of a diaphragm-like member which defines a volume exposable to a regulated vacuum pressure at one side and atmospheric pressure at the other side. The motors also include springs biasing the diaphragm to a position wherein the volume is maximum. The diaphragm is linked to a blend door or valve. In order for the blend door or valve to be maintained stationary, the regulated vacuum pressure in the fluid motor must be accurately maintained. Fluid motors of the type referred to are generally relatively large and expensive and often require equipment to maintain adequate control of the pressure within the motor.

Summary of the invention

The present invention provides a compact, easily serviceable temperature control system for an automotive vehicle or the like which utilizes a pair of relatively inexpensive fluid motors to control positioning of a valve or blend door of the system. A system constructed in accordance with the invention includes a control unit having temperature control circuitry, valves controlling the fluid motors and valves controlling the position of dampers in the system. The control unit is of modularized construction so that the unit need not be disassembled to service or replace parts.

An object of the present invention is the provision of a new and improved comfort temperature control system for the passenger compartment of an automotive vehicle or the like of the type which includes air heating and air chilling means through which air is selectively directed by ducts arranged to discharge tempered air into the compartment, the ducts including fluid pressure operated dampers or doors therein for selectively directing air through the heating and cooling means and an electrically energized blower for moving air through the ducts, and a control unit pneumatically connected with the damper control means and electrically connected with the blower for controlling operation of the dampers and blower in accordance with temperature conditions in the compartment or ducts, which unit is compact and comprised of modular components by which a minimum number of pneumatic and electrical connections are made in the installation or replacement of the control unit in the system, and which unit can be conveniently mounted in the vehicle within a relatively confined area.

Another object of the present invention is the provision of a new and improved automotive temperature conditioning system including air chilling means, air heating means and means for controlling heat transfer in the system in response to sensed temperature so that air at a predetermined desired temperature is directed from the system into the passenger compartment of the vehicle and wherein the control means includes a member which is movable to change the amount of heat transferred from the heating means to air in the system and means for positioning the member in response to sensed temperature including first and second vacuum motors connected to the member through a drive linkage with one motor operable to move the member so as to reduce the temperature of the air entering the passenger compartment and the other motor operable to move the member toward a position wherein the temperature of the air entering the compartment is increased, with the member movable only in response to application of pressure to one or the other of the motors.

Another object of the present invention is the provision of a new and improved temperature conditioning system for an automotive vehicle set forth in the next preceding paragraph and further including an electrically energized blower for providing a forced flow of air to the passenger compartment of the vehicle and switch means connected in an energization circuit for the blower motor and drivingly connected to the aforementioned vacuum motors and the movable member, the switch means being operated to provide changes in speed of the blower motor according to movement of the member.

A further object of the present invention is the provision of a new and improved temperature conditioning system of the type described wherein the movable member is a vane-like door pivotally supported within the system and movable by one of the fluid motors to a position wherein air is directed from the air heating means to reduce air temperature in the passenger compartment and which is moved by the other fluid motor to a second position wherein air in the system is directed to the air heating means to increase air temperatures within the passenger compartment and in which the fluid motors cooperate to maintain the door member in any position between the aforementioned first and second positions to provide a flow of air to the passenger compartment at a preselected temperature.

Other objects and advantages of the present invention will become apparent from a consideration of the following detailed description thereof and from the accompanying drawings which form a part of the specification and wherein:

FIG. 4 is a schematic illustration of a portion of the system shown of FIG. 1;

FIG. 5 is a graphic representation of the characteristics of an amplifier forming a part of the illustration shown in FIG. 4;

Figure 1:
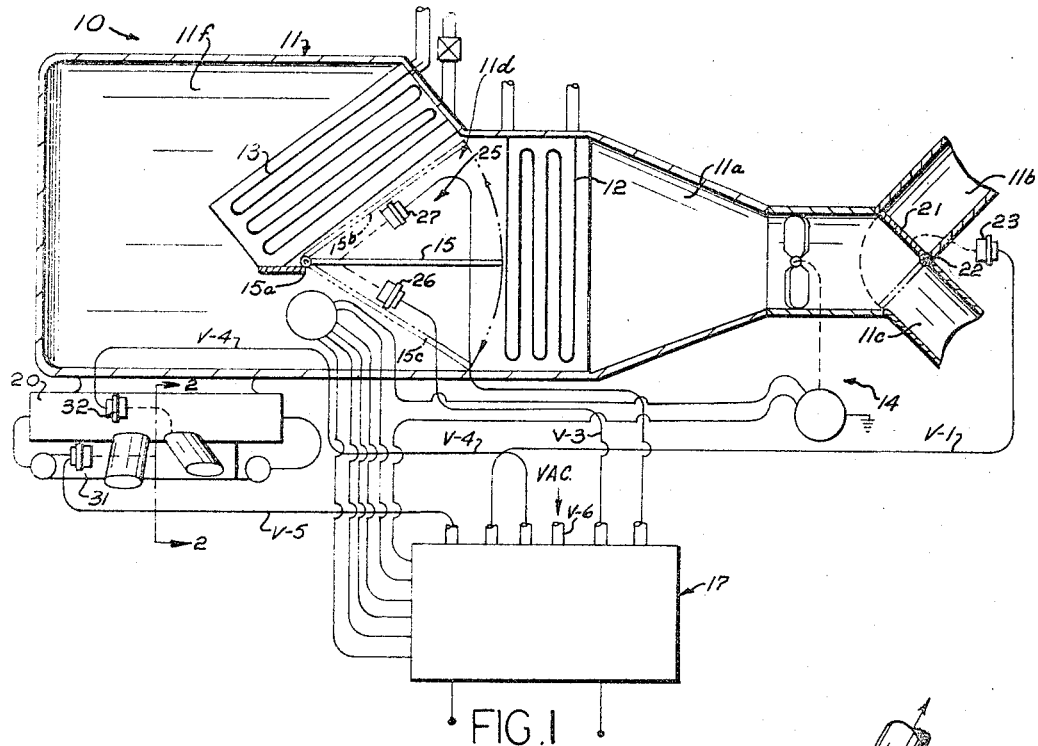
FIG. 1 is a schematic representation of a temperature conditioning system embodying the present invention.

The present invention provides a temperature control system for an automotive vehicle, or the like, wherein outside air or recirculated air may be cooled, cooled and reheated, or heated, and then directed to a passenger compartment of the vehicle at a desired temperature and in an automatic fashion. A temperature control system 10 embodying the invention is illustrated in FIG. 1 and includes duct means 11, an air cooling heat exchanger 12, which may be evaporator coils of a conventional automotive air conditioning unit, not shown, an air heating heat exchanger 13, which may be a heater core of a conventional automotive heater having engine coolant flowing therein, an electrically energized blower 14 for providing a forced flow of air in the duct means, a vane or door-like member 15 which is movable to direct more or less air, which has flowed across the cooling coil 12, through the heater core 13, a plurality of air flow directing dampers, too be described, and means 17 for controlling operation of the dampers, the vane 15, and the blower unit 14.

The temperature control system 10 is of the general type wherein the air conditioning unit and heater are normally operative to transfer heat from and to air in the duct means when the system has been rendered operative by an occupant of the vehicle. In the illustrated embodiment, the system is rendered operative by depression of one of the manually operated push button selector switches S2, S3, S4, S6 (see FIG. 4), which connect the control means 17 across terminals B+, G of a suitable power supply, such as the battery of the vehicle, and which switches will be described in greater detail hereinafter. Generally speaking the air passing through the duct means is cooled and reheated before entering the passenger compartment, however when air temperatures ambient the vehicle are relatively low the air conditioning unit is rendered inoperative and when temperatures ambient the vehicle are relatively high, the heater core is rendered ineffective to reheat the chilled air by operation of the door-like member 15.

More particularly, in the illustrated embodiment the heater core is always supplied with engine coolant and the air conditioning unit is operative at all outside temperatures above a predetermined temperature, for example 35° F. When outside air temperatures are below 35° F., the air conditioning unit is declutched from the vehicle engine. When any of the selector switches S2, S3, or S4 are depressed as described, a clutch energizing circuit for the air conditioning unit is completed from the battery terminal B+ through contacts of the closed selector switch, closed contacts of a temperature responsive switch TS, a clutch actuating solenoid coil 18 and to ground G. Energization of the solenoid 18 drivingly connects the vehicle engine and the compressor of the air conditioning unit. An idle compensating solenoid 19 is connected in parallel with the clutch actuating solenoid and is energized when the solenoid 18 is energized to increase the idle speed of the engine when the air conditioning unit is operating. When outside air temperature drops below 35° F. the switch TS opens and the air conditioning unit is declutched from the engine.

The duct means 11 includes an inlet section 11a which receives air from either outside of the vehicle, through a duct portion 11b, or from the passenger compartment through a duct portion 11c. Air flowing from the inlet portion 11a enters a chamber-like portion 11d of the duct means in which the cooling coils 12 and the heater core 13 are situated and is directed from the chamber portion 11d to a suitable plennum chamber 20 through an opening 11e in the duct means. The chamber portion 11d includes an offset portion 11f in which the heater core 13 is located so that, under circumstances which will be described, a certain proportion of the air which has passed across the cooling coils 12 may be directed through the heater core 13 to be reheated and such air is subsequently mixed with the unheated portion of the air adjacent the opening 11e from which it is directed into the passenger compartment of the vehicle.

Whether fresh or recirculated air enters the inlet portion 11a of the duct means 11 depends upon the position of a damper 21 positioned in the inlet portion 11a of the duct means and which damper 21 is pivoted at 22 so as to be movable between a position wherein fresh air is blocked from entering the inlet portion 11a of the duct means or positioned wherein fresh air may freely enter the duct means and which position is illustrated in the drawings. The position of the damper 21 is controlled by a vacuum motor 23 which is connected to the control means 17 by a suitable vacuum line V–1 so that when vacuum pressure is applied to the vacuum motor 23 from the control means 17 through the line V–1, the damper 21 is moved so as to permit a flow of fresh air into the inlet portion 11a of the duct means. When the damper 21 is in its position illustrated by broken lines in FIG. 1, air from the passenger compartment is recirculated through the duct means.

The vane 15, which will sometimes be referred to hereinafter as a "blend door," for reasons which will become apparent, is pivoted at 15a and is movable between a position 15b wherein none of the air in the chamber portion 11d flows across the heater core 13, and a position 15c wherein all of the air flowing through the chamber portion 11d of the duct means 11 flows through the heater core 13. When the blend door 15 is in any position intermediate its positions 15b, 15c a portion of the air in the chamber portion 11d flows across the heater core 13 and is reheated, while the remainder of the air in the chamber portion 11d flows toward the opening 11e in the duct means, adjacent which it is mixed with the heated portion of the air to provide an air flow to the passenger compartment at temperatures determined by the position of the door 15.

The door 15 is drivingly connected to a servo-unit 25 which is operative to move the door 15 to any desired position between its extreme positions 15b, 15c and which maintains the door in such position to provide a predetermined mixed air temperature flowing through the outlet portion 11e of the duct means and to the plenum chamber 20. The servo-unit 25 includes vacuum motors 26, 27 which are connected to the control means 17 through suitable vacuum lines V–2, V–3 and with the control means 17 operable to control the operation of the servo-unit 25 in a manner which will be described.

Air entering the passenger compartment of a vehicle is commonly directed into the compartment according to the desired conditions to be maintained in the passenger compartment, that is to say, high temperature air is generally directed onto, or toward, the floor of the passenger compartment while cooled air is directed both toward the floor and upwardly into the passenger compartment, while air which is utilized to defog and de-ice the windshield of the vehicle is directed upwardly and onto the windshield. The plenum chamber 20 includes a number of passageways which are adapted to direct air in all of the aforementioned directions and includes dampers which are movable to properly direct air through the plenum chamber and into the passenger compartment in accordance with the function to be performed by such air, i.e. cooling, heating, defogging, de-icing. In the illustrated plenum chamber two such dampers 28, 29 are utilized which dampers are drivingly connected to vacuum motors 31, 32, respectively, for movement between their positions illustrated by solid and broken lines in FIG. 2. The vacuum motors 31, 32 are connected to the control means 17 through vacuum lines V–4, V–5, and their operation will subsequently be described in greater detail in their relationship to the control means 17.

Figure 3:
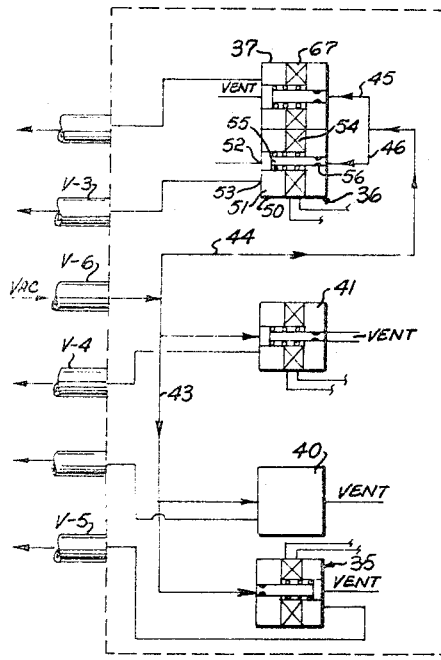
FIG. 3 is a schematic illustration of a portion of the system shown in FIG. 1.

As illustrated in FIG. 3, the control means 17 includes a vacuum circuit which includes valving for controlling the vacuum applied to individual ones of the aforementioned vacuum motors associated with the duct means 11 and plenum chamber 20. The vacuum circuit V communicates with a source of vacuum pressure in the vehicle engine, not shown, through a vacuum conduit V–6 and which vacuum is communicated to suitably constructed solenoid operated valves 35, 36, 37, 40, 41, which valves are shown schematically in FIG. 3. The valves 35, 40, and 41 communicate with the vacuum conduit V–6 through a suitable manifold 43, while the valves 36, 37, communicate with the conduit V–6 through conduits 44, 45, 46. Each of the aforementioned valves includes an output opening or port which is communicable with a vent opening to atmospheric pressure or a vacuum source opening from their respective vacuum manifolds so that fluid at vacuum pressure from the vacuum source may be communicated to the individual vacuum motors when desired by operation of the particular valve associated therewith.

The vacuum motors referred to herein may be of any suitable construction but in the preferred embodiment include a flexible resilient diaphragm having one side bounding an enclosed volume communicating with the outlet port of its respective valve, and an opposite side of the diaphragm exposed to atmospheric pressure as is conventional. The diaphragms of the motors 23, 31, 32 are associated with suitable springs which bias the diaphragms to a predetermined position when each side of the diaphragm is exposed to atmospheric pressure, but which permit movement of the diaphragms against the spring force when the enclosed volume therein is exposed to vacuum pressure. It should be apparent that the dampers referred to are suitably linked to the diaphragms and are moved in response to the aforementioned movement of the diaphragms. The vacuum motors 26, 27 associated with the valves 36, 37 are preferably similar to the vacuum motors associated with the dampers, but do not include a biasing spring as described above. For this reason, when both sides of the diaphragms of these motors are exposed to atmospheric pressure, the diaphragm tends to be maintained in the position to which it was moved by the imbalance of pressure acting thereon.

Each of the valves is a solenoid operated poppet type valve, three of which are illustrated diagrammatically, but in some detail, in FIG. 3. The valve 40, which controls operation of the vacuum motor 23 at the inlet side of the duct means 11 is normally closed so that when the solenoid associated therewith is de-energized, no vacuum is applied to the motor 23 and the damper 21 is in its broken line position wherein air from the passenger compartment enters the inlet portion 11a of the duct means and is recirculated into the passenger compartment. When the solenoid of the valve 40 is energized the damper 21 is moved to its position wherein fresh outside air enters the duct means 11.

The valves 36, 37 are normally open valves, which is to say, that when the solenoids therefor are de-energized, the vacuum motors 26, 27 associated therewith communicate with the source of vacuum through the lines V–2, V–3, respectively, and when the solenoids for the valves 36, 37 are energized the motors 26, 27 are vented to atmospheric pressure.

The valve 35 is a normally open valve which controls the position of the damper 28 in the plenum chamber associated with the fluid motor 32, and when the solenoid of the valve 35 is de-energized, the vacuum motor 32 associated therewith positions the damper 28 in the plenum chamber such that air supplied to the passenger compartment flows generally upwardly into the compartment. Energization of the solenoid of the valve 35 is effective to move the damper 28 to its position illustrated in full lines so as to provide for flow of air along the floor of the vehicle, as in heating, or provides air flow on to the windshield for de-fogging or de-icing thereof, depending on the position of the damper 29.

The valve 41 is associated with the vacuum motor 31 and damper 29 through the vacuum line V–4 and is a normally closed valve so that when its solenoid coil is energized, the damper 29 is moved to direct air from the plenum chamber 20 along the windshield of the vehicle and accordingly, the valve 41 is open only when defogging or de-icing of the windshield is necessary.

A typical schematic construction of a normally open valve of the type mentioned is illustrated in reference to the valve 36 which is shown in FIG. 3. As illustrated in FIG. 3, the valve 36 includes a housing 50 which forms a chamber 51 therein which chamber communicates with the vacuum line 46, a vent opening 52, and with the vacuum line V–3 through an outlet port 53. A solenoid coil 54 is supported within the chamber 51 and surrounds a valve body 55 which is movable axially of the solenoid coil 54 and is biased in a sealing engagement with the vent opening 52 by a suitable spring. The vacuum pressure in the line 46 is communicated to the chamber 51 through an opening along the axis of the solenoid coil 54 through a suitable flow restrictor 56 so that when the valve 36 is in its position shown in FIG. 3, the vacuum line V–3 is substantially at the pressure of the vacuum source. When the solenoid coil 54 is energized, the valve member 55 is moved to the right, as viewed in the drawings, to vent the chamber 51 to atmospheric pressure which results in equalization of pressure across the vacuum motor 26. It will be apparent that the vacuum motor 26 associated with the line V–3 is no longer effective to exert a force on the blend door 15 when the chamber 51 is vented as described. The valve 37 associated with the vacuum motor 27 is identical in structure and in function to the valve 36 and further description thereof at this point is not necessary.

The valves 40, 41 are constructed in the same manner as set forth above and with respect to the valve 36 except that the vent and vacuum source connections are reversed so that these valves are normally closed and the vacuum motors 23, 32 associated therewith are normally exposed to atmospheric pressure, when the solenoids of these valves are energized, the valve members thereof move to the right as viewed in FIG. 3, and thereby expose the motors 23, 32 to vacuum pressure to effect operation thereof.

The control means 17 additionally includes electrical circuitry for energizing the solenoid coils of the valves 35–37, 40 and 41. As mentioned previously, the control means 17 is rendered operative by actuation of one of the switches S2, S3, S4 or S6. The circuitry for controlling operation of the valves 36, 37 is illustrated in FIG. 4 and includes an amplifier 60 having first and second output circuits which are connected across terminals B+ and G of a suitable 12-volt DC power supply, such as the battery of the vehicle, and which output circuits can be traced, when the switch S2 is closed, from the terminal B+ of the power supply through the ignition switch S1, a junction 61, closed contacts 63, 64 of the push-button selector switch S2, a junction 65, a junction 66 through a conductor C1, the solenoid coil 54 of the valve 36 and to the ground terminal G of the power supply through a conductor C2. The second output circuit of the amplifier 60 can be traced in a similar manner from the terminal B+ to the amplifier 60, and through a solenoid coil 67 of the valve 37 and to the ground terminal G of the power supply through the conductor C2.

Alternate energization circuits for the solenoid coils 54, 67 can be traced through closed contacts of either of the pushbutton switches S3 or S4. When the switch S3 is depressed and closed, the energization circuits may be traced from the terminal B+ through the ignition switch S1, junction 61, a junction 68, contacts 70, 71 of the switch S3, a junction 72, the junction 65, and into one or the other of the respective output circuits of the amplifier 60, as described. When the switch S4 is depressed and closed, an energization circuit for the amplifier 60 is established from the terminal B+ to the junction 68 as described above, through contacts 73, 74 of the switch S4, the junction 72, the junctions 65, and to the output circuits of the amplifier 60. Operation of the switch S6 and additional functions of the switches S2, S3, S4 will be described presently.

The amplifier 60 is preferably constructed of solid state components which are organized to effect energization of either the solenoid coil 54, or the solenoid coil 67, or both solenoid coils, depending on the input signal to the amplifier.

An input circuit for the amplifier 60 is shown in part in FIG. 4 and which input circuit is connected across the battery terminals between the conductor C1 and a junction 75 at ground potential when the aforementioned switches are closed. The input circuit includes temperature responsive resistors or thermistors R1, R2 and potentiometers R3, R4. The thermistor R1, termed an ambient sensor, is preferably located in the inlet portion 11a of the duct means 11 and has a resistance which varies with changes in temperature of air ambient thereto. The thermistor R2 is suitably located in the passenger compartment of the vehicle and has a resistance which varies in response to changes in the temperature of air within the vehicle passenger compartment. The potentiometer R3 is termed a temperature selector potentiometer and is preferably associated with a linkage controllable by an occupant of the vehicle so as to permit setting of a desired in-car temperature by the occupant. The potentiometer R4 is a feedback potentiometer which is described in greater detail hereinafter.

The resistors R1–R4 are preferably connected in circuit with a control electrode of a suitable transistor, or transistors, not shown, of the amplifier 60, and in general provide a voltage level at the control electrode of the transistor which varies at the temperature sensed by the aforementioned sensors. When ambient, or the in-car temperature changes, the resistance of the elements R1, R2 changes accordingly to alter the input voltage to the amplifier 60 so as to effect changes in the output circuits thereof and the voltage across the solenoid coils 54, 67 accordingly. The thermistors R1, R2 preferably have negative temperature coefficients of resistance so that as the air temperature sensed thereby increases, the resistance of these thermistors decreases and vice versa.

FIG. 5 illustrates the relationship between the voltage across the solenoid coils in the first and second output circuits of the amplifier 60 and air temperature and resistance of the input circuit. When the resistance of the input circuit is low, the voltage drop across the solenoid 54 of the valve 36 is large so that the solenoid 54 is energized to close the vacuum port of the valve 36 and open the vent port thereof to render the cooling vacuum motor 27 inoperative to apply a force to the blend door 15. It will also be noted that when resistance in the input circuit is low, the output circuit of the amplifier 60 through the solenoid coil 67 is not sufficiently conductive to energize that solenoid so that the heating vacuum motor 26 is supplied with vacuum pressure and is operable to move the blend door 15 toward its position 15c. Conversely, when the resistance of the input circuit elements increases above a predetermined resistance, the output circuit of the amplifier 60 associated with the solenoid coil 67 becomes conductive to energize that solenoid while conduction in the output circuit through the solenoid coil 54 becomes less conductive. When the resistance of the input circuit is increased as described, the heating vacuum motor 26 is inoperable to exert a force on the blend door 15 since energization of the solenoid valve 36 vents the vacuum motor 26 to atmosphere while the cooling vacuum motor 27 is again communicated with the vacuum pressure and is effective to move the blend door 15 toward its position 15f wherein cooler air is supplied through the duct means 11 to the passenger compartment of the vehicle.

In the preferred embodiment, the valve members of the valves 36, 37 close their associated vacuum ports at approximately 8 volts DC across the solenoid coil in each respective output circuit of the amplifier 60, and the vacuum ports are not reopened until the voltage in the output circuit across the solenoid 54, or the coil 67 has dropped to approximately 2 volts DC. Accordingly, it is apparent that the vacuum ports in each valve 36, 37 are closed over the range of resistances and temperatures indicated at X in FIG. 5, and that when input circuit resistances are within the range X, the motors 26, 27 of the servo-unit 25 are at rest, since each motor is vented to atmosphere, to maintain the blend door 15 in a particular position to which it was previously moved by the motor 26, or 27. When sensed air temperatures increase sufficiently to cause the input circuit resistance to decrease out of the range X, the vacuum motor 27 is communicated to vacuum pressure and the blend door 15 is moved toward its position 15b. Conversely, when sensed air temperatures decrease and the resistance of the input circuit increases out of the range X, the vacuum motor 26 is communicated with the vacuum pressure source and the blend door 15 is moved toward its position 15c.

Figure 6:
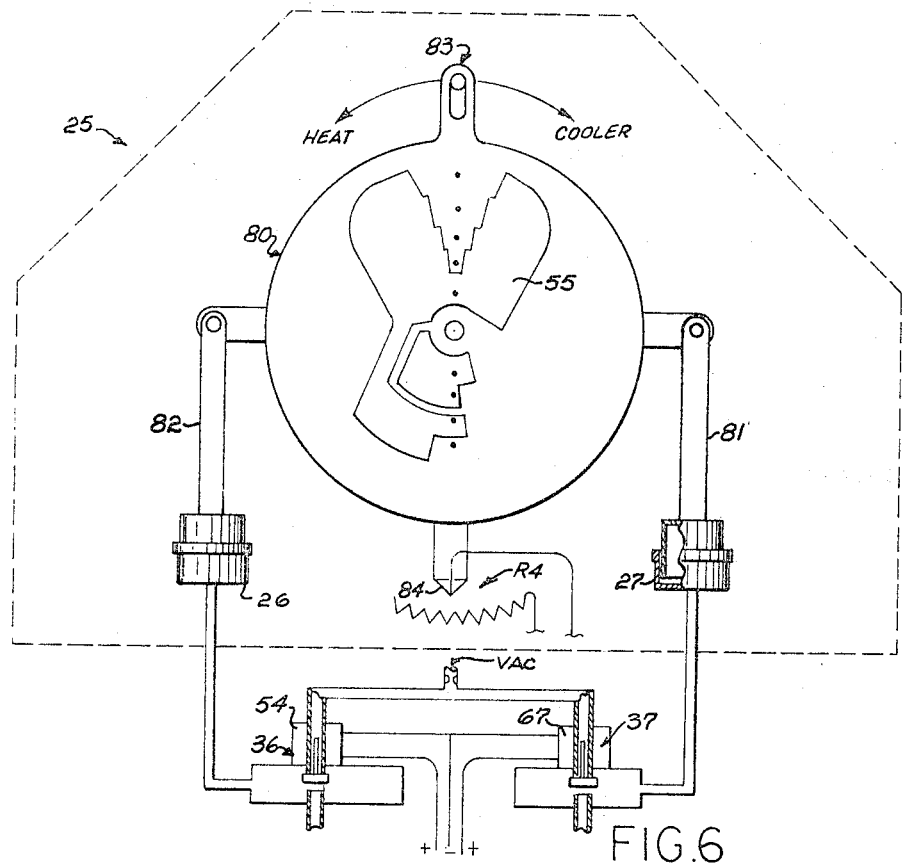
FIG. 6 is a schematic plan view of the apparatus of the system of FIG. 1 with parts in section.

A schematic representation of the servo-unit 25 operatively related with the valves 36, 37 is illustrated in FIG. 6. The vacuum motors 26, 27 are drivingly connected to a driven assembly 80 through drive links 81, 82, respectively. The driven assembly 80 includes a drive connection 83 for pivoting the blend door 15 in response to rotation of the assembly 80, the feedback potentiometer R4, and a printed circuit-type rotary switch S5 which is connected in circuitry for controlling the speed of the blower 14 in a manner to be described.

When the resistance of the input circuit of the amplifier 60 decreases, indicating, for example, an increased temperature within the passenger compartment of the vehicle, the solenoid coil 67 is de-energized to communicate the motor 27 to vacuum pressure as described, and effects movement of the assembly 80 in a clockwise direction, as viewed in FIG. 6, since the solenoid coil 54 of the valve 36 is fully energized and the motor 26 contrives to be vented to atmosphere. Rotation of the assembly 80 in a clockwise direction moves the blend door 15 toward its position 15b to increase the amount of chilled air directed into the passenger compartment.

Clockwise movement of the assembly 80, as viewed in FIG. 6, moves the wiper 84 of the feedback potentiometer R4 in a clockwise direction so as to increase the resistance of the feedback potentiometer and thereby increase the resistance of the input circuit of the amplifier 60 in accordance with the position of the blend door. When the input circuit has been increased back into the range X of FIG. 5, both solenoid coils 54, 67 are energized and the blend door is stopped in a position dictated by the sensed temperature.

When the resistance of the input circuit increases, signifying a decrease in temperature in the passenger compartment of the vehicle, or a decrease in temperature ambient the sensor R1, the solenoid coil 54 is de-energized to open the vacuum port of the valve 36 and effect rotation of the assembly 80 in a counterclockwise direction by the motor 26 so as to move the blend door toward its position 15c wherein warmer air is directed from the duct means 11 into the passenger compartment of the vehicle. Counterclockwise movement of the assembly 80 moves the wiper 84 of the potentiometer R4 in a counterclockwise direction to reduce the resistance of that potentiometer in accordance with movement of the blend door so that the blend door is stopped in the position wherein the resistance of the input circuit is within the region X of FIG. 5 and both the motors 26, 27 are again vented to atmosphere to hold the door in its position, as previously mentioned.

Figure 7:
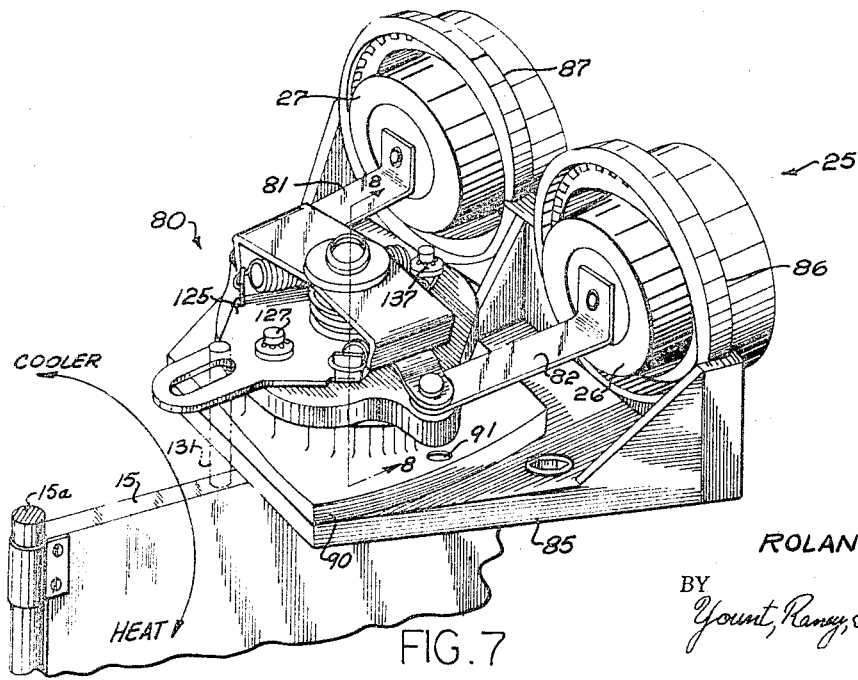
FIG. 7 is a perspective view of the certain of the apparatus shown schematically in FIG. 4.
Figure 8:
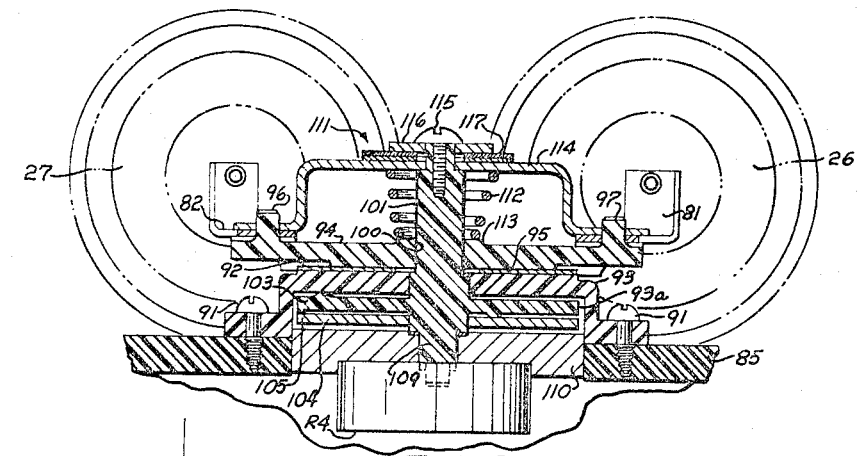
FIG. 8 is a sectional view taken approximately at line 8—8 of FIG. 7.

The servo-unit 25 is mounted on the upper side of the duct means 11 adjacent the pivot axis of the blend door 15, and includes a base member 85 having spaced supports 86, 87 extending upwardly therefrom, as viewed in FIG. 7, which support the vacuum motors 26, 27, respectively. The base member 85 is adapted to be connected to the duct means by suitable screws which extend through the member and into the upper wall of the duct means 11 and which connections are not shown in detail.

The assembly 80 includes a fixed support member 90 connected to the base member 85 by suitable screws 91 and which includes an upper support surface 92 which is provided by an inverted cup-like portion 93 which forms a chamber 93a between the member 90 and the base 85. The surface 92 supports a disc-like rotatable drive member 94 and a friction disc 95 which is interposed between the surface 92 and the disc 94 so as to resist relative motion therebetween.

The member 94 includes drive lugs 96, 97 extending upwardly therefrom and which provide a driving connection between the member 94 and the links 81, 82 connected to the motors 26, 27. A square, or polygonal, opening 100 is provided in the center of the member 94 which received a shaft member 101 having a correspondingly polygonal cross-section so that the shaft member 101 is driven by the member 94 when the member 94 rotates. The shaft member 101 extends through the member 94 and a circular opening in the support surface 92 in the member 90 so that the shaft 101 is rotatable relative to the member 90 upon rotation of the member 94.

An annular driver plate 103 is formed integrally with the shaft 101 and which is positioned within the chamber 93a of the member 90 and is drivingly connected to a rotor-like circuit board 104 in the chamber 93a by a suitable connection such as shown at 105. The driver plate 103 includes a plurality of dimples at its opposite sides which cooperate with an upper wall of the chamber 93a and with the circuit board 104 so that rotation of the circuit board is maintained in a plane which is transverse to its axis of rotation.

The lower portion of the shaft 101, as viewed in the drawings, extends through an annular opening 109 in a cover plate 110 which is fixed in the base member 85 to close the chamber 93a. The end portion of the shaft 101 is drivingly connected to the wiper 84 of the feedback potentiometer R4 so that rotation of the member 94 and shaft 101 effects movement of the wiper 84 of the potentiometer to change the resistance thereof as described hereinabove.

The shaft 101 is urged upwardly relative to the base 85 by a spring tensioning assembly generally indicated at 111 and which includes a helical spring 112 compressed between a shoulder 113 on the member 94 surrounding the aperture 100 and a spring plate 114 which is connected at its ends to the drive lugs 96, 97 and which includes an aperture for receiving an upper end of the shaft 101. The upper end of the shaft 101 includes an axially extending threaded opening for receiving a screw 115 which carries a washer 116 and tensioning washers 117 interposed between the head of the screw 115 and the spring plate 114 so that when the screw is advanced into the threaded opening in the shaft 101 the spring 112 is compressed between the member 94 and spring plate 114.

The spring 112 urges the member 94 and friction disc 95 into engagement with the surface 92 of the member 90 and the amount of spring force controls the frictional force between the friction disc 95 and the support member 90. The friction disc 95 is a flat annular member having an opening in the center thereof and in the preferred construction, is of a cork and neoprene composition with these materials proportioned such that the static coefficient of friction between the members 90, 94 is substantially identical to the dynamic coefficient of friction therebetween, to insure smooth starting and stopping of the blend door 15 as it is moved. Additionally, the friction disc 95 and tensioning assembly 111 cooperate to insure that the force maintaining the blend door in position is sufficient to prevent the forced air flow produced by the blower 14 from moving the blend door out of position. The spring force exerted by the spring 112 can be adjustably varied by providing a greater or smaller number of washers 117 between the washer 116 and the spring plate 114.

The printed circuit switch S5 includes a copper printed circuit portion 118, which is carried on the lower side of the circuit board disc 104 and rotates upon rotation of the member 94 by either of the motors 26, 27 as described previously, and fixed contacts engageable with the copper circuit 118. The fixed contacts of the switch S5 are in the form of conductors which extend through the cover plate 110 and into engagement with the rotor 104 and which conductors are associated with suitable terminal bars at their ends, not shown, and which terminal bars are supported at the bottom side of the base member 85. The terminal bars associated with the switch S5 are illustrated schematically in FIG. 4 and are interconnected by resistors which provide variable blower motor speeds in response to rotation of the copper circuit on the circuit board disc 104. More specifically the stationary contacts associated with the resistor are disposed between diverging, stepped, edges 119, 120 of the copper circuit 118 so that as the circuit board disc 104 rotates, the copper circuit successively engages these contacts to vary the blower speed as will be described in detail presently. Suffice it to say that the switch S5 is constructed so that blower speeds are varied by rotation of the disc 104 through an angular extent which is greater than the amount of rotation required to move the blend door 15 from a centered position to one or the other of its limit positions. The terminal bars extend from their respective contacts outwardly of the side of the base member 85 adjacent the support portions 86, 87 so as to be suitably connected to the control means 17. The relationship of the switch S5 and the terminal bars and resistors associated therewith, to the control means 17 will be described in more detail hereinafter.

Figure 9:
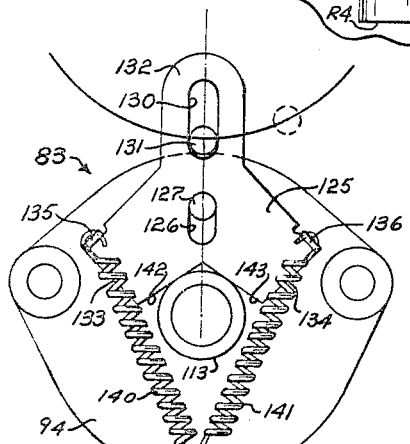
FIGS. 9, 10 and 11 are fragmentary views of a portion of the mechanism of FIG. 5 showing different operative positions thereof.
Figure 10:
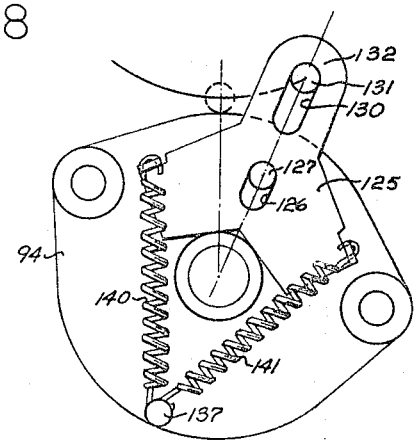
Figure 11:
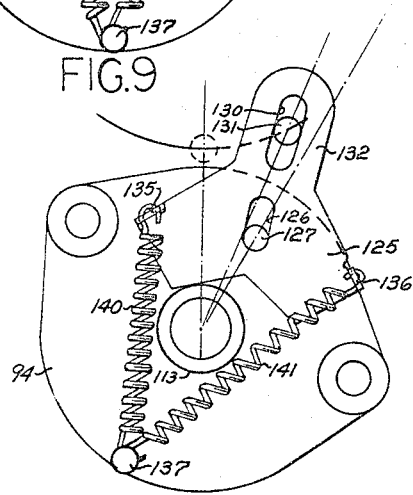
Figure 12:
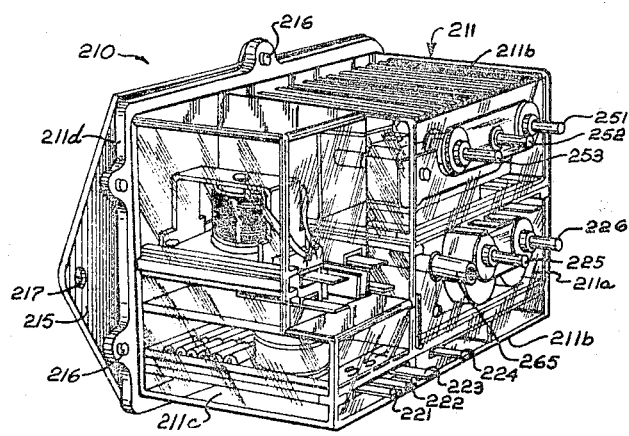
FIG. 12 is a perspective view of a unit of the apparatus of FIG. 1.

As noted previously, the amount of rotation necessary for the switch S5 to perform all of its switching functions is greater than the amount of rotation necessary to move the blend door 15 between its limit positions and for this reason the linkage 83 is constructed so as to positively transmit a driving force between the member 94 and the blend door when the blend door is at, or intermediate, its limit positions and yet which permits further rotation of the member 94 while positively holding the blend door in either of its limit positions 15b, 15c. As illustrated in FIGS. 9–11, the linkage 83 includes a plate-like generally Y-shaped member 125 having an elongate opening 126 generally at the central portion thereof which receives a circularly cross-sectioned drive lug 127 connected to the member 94 and a similar elongate opening 130 having its longitudinal axis aligned with that of the opening 126 and which receives a pin 131 fixed to the blend door 15. The aperture 130 is formed in a projecting portion 132 of the link member 125 and which extends outwardly from the member 94 such that the pin 131 is slidably received in the aperture 130 without interference with the servo-unit.

The link member 125 additionally includes arms 133, 134 each of which includes upstanding tabs 135, 136, each of which tabs are connected to a pin 137 extending from the member 94 by substantially identical tensioning springs 140, 141. The springs 140, 141 maintain angularly related sides 142, 143 of the arms 133, 134, respectively, in engagement with the shoulder 113 formed on the member 94 so that the longitudinal axes of the apertures 126, 130 lie along a radial line through the axis of rotation of the shaft 101. The parts of the linkage 83 and the member 94 are maintained in the relationship just described when the blend door 15 is in any position between its limiting positions, except that the pin 131, connected to the blend door, slides longitudinally in the aperture 130 as the blend door moves between a limiting position and a position wherein the door is medially located with respect to its limiting positions 15b, 15c. The above described relationship between the elements of the linkage 83 is illustrated in the FIGS. 9 and 10, with the latter mentioned figure illustrating the position of the member 94 and the elements of the linkage 83 when the blend door is in its limit position 15b to provide for maximum flow of cooling air to the vehicle passenger compartment.

As the member 94 continues to move in a clockwise direction when the blend door 15 is in its position illustrated in FIG. 10, the member 125 is moved relative to the member 94 to its position shown in FIG. 11. It should be apparent that as the member 94 continues to rotate with the blend door in its limit position, a twisting couple is exerted on the member 125 by the pins 127, 131 which results in sliding movement between the side 142 of the arm 133 and the shoulder 113 on the member 94. During sliding movement of the side 143 relative to the shoulder 113, the member 125 is cammed radially outwardly of the member 94 and twisted slightly in a counterclockwise direction, as viewed in the drawings, against the spring force of the spring 141 so that the longitudinal axes of the apertures 126, 130 are no longer on a radial line through the axis of rotation of the shaft 101. The tension in the spring 141 tends to turn the member 125 clockwise about the pin 127 and in so doing, exerts a force on the pin 131 which is effective to maintain the blend door 15 in its limit position described above while permitting the switch S5 to continue performing switching functions. As the member 94 turns in a counterclockwise direction from its position illustrated in FIG. 11 the side 143 of the arm 133 is moved along the shoulder 113 of the member 94 by the force of the spring 141 so that the member 125 is cammed into its position illustrated in FIGS. 9 and 10 at which position the tension in the springs 140, 141 is again balanced and the longitudinal axes of the apertures 126, 130 again lie along a line through the axis of rotation of the shaft 101.

It should be apparent that counterclockwise rotation of the member 94 drives the blend door 15 to its limiting heating position and that further rotation of the member 94 to permit the switch S5 to perform additional switching functions with the blend door in its limit position can be accomplished by the linkage 83 in a manner similar to that described in reference to movement of the member 94 in a clockwise direction, and therefore description of this relationship between the linkage 83, the member 94, and the blend door 15 is not necessary.

As noted above, the switch S5 in the servo-unit 25 is effective to control operation and speed of operation of the motor M of the blower 14 and also controls opening and closing of the damper 21 associated with the vacuum motor 23 in certain instances. As best illustrated in FIG. 4, the switch S5 is connected in circuitry from the terminal B+ of the power supply through the control means 17, the contacts of the switch S5, the blower motor M, and to the negative or ground terminal G of the power supply.

The control means 17 includes a selector switch unit 150 and a power unit 151. The selector switch unit 150 includes an "ON-OFF" actuator 152, the switch S2 which is closed to provide a low blower speed range, the switch S3 which is closed to provide a high blower speed range, the switch S4 which is closed to provide for defogging of the windshield of the vehicle, and a de-ice switch S6 which is closed when removal of ice from the windshield is desired. The switches S2, S3, S4, S6 are all push-button type switches as noted above, with the buttons conveniently accessible to the occupant of the vehicle, and mechanically linked together so that depression of one switch closes its contacts and operates the linkage to open the contacts of any other of these switches which might have been previously closed. When the "ON-OFF" mechanism is actuated to its "OFF" position, any of the contacts of the switches S2, S3, S4, S6 which are closed, are opened by the aforementioned linkage. Such linkages are well known and therefore the specific linkage has not been illustrated.

During normal operation of the temperature control system if a low blower speed range is desired, the switch S2 is depressed so as to close the contacts 63, 64 and contacts 153, 154 thereof. When the contacts 63, 64 are closed, the amplifier 60 is connected in circuit across the terminals of the source of the power supply B+ as described previously. Closing of the contacts 63, 153 completes an energizing circuit for the blower motor M from the terminal B+ of the power supply through the ignition switch S1, junction 61, contacts 63, 153 of the switch S2, a low range resistor R5, closed relay contacts RC–1 of a relay RC, a junction 155, a resistor R6, junction 156, resistor R7, junction 157, resistor R8, junction 158, resistor R9, a junction 160, junction 161, through the motor M and to the terminal G of the power supply. Additionally, an energizing circuit for the solenoid coil 164 of the valve 40 which controls the fresh air damper 21 is completed when the contacts 63, 153 are closed with the copper circuit in its illustrated position and which circuit can be traced from the terminal B+ through the switch S2 and to the junction 155 associated with the resistor R2, through the contact 162 of the switch S5, the copper circuit 118, a contact 163 of the switch, the solenoid 164 of the valve 40 and to ground. Energization of the solenoid 164 effects movement of the valve member of the valve 40 so as to permit vacuum to be applied to the motor 23 to maintain the damper 21 positioned such that fresh air enters the duct means 11 through the inlet portion 11c previously described. It should be apparent that with the resistors R5–R9 connected between the terminal B+ of the power supply and the blower motor M, the speed of the blower motor is relatively low due to the substantial voltage drop across these resistors.

The relay contacts RC–1 are normally closed contacts of the relay coil RC. That is to say, when the relay coil RC is not energized, the contacts RC–1 are closed to complete the aforementioned circuit for the blower motor M and the solenoid coil 164 of the valve 40. The relay coil RC is only energized when heated air is to be provided to the passenger compartment of the vehicle and the temperature of the engine coolant in the heater core 13 is not sufficiently high to provide heated air to the passenger compartment. This situation exists when the vehicle engine has just been started and the engine coolant has not had time to heat up. Under such circumstances, when the contacts of the switch S2 are closed, an energization for the relay coil RC is established from the power supply B+ through the ignition switch S1, junction 61, contacts 63, 154 of the switch S2, through the relay coil RC, contacts 166, 167 of the switch S5, the contacts of a coolant temperature switch S7 and to the ground terminal G of the power supply. The coolant temperature switch S7 is suitably constructed so as to open at a predetermined engine coolant temperature, for example, 115° F., and when opened, interrupts the energization circuit for the relay coil RC, just described, to de-energize the coil and reclose the contacts RC–1.

It should be noted that the relay coil RC is only energized when heat is to be transferred to air entering the passenger compartment of the vehicle so that when the switch S5 is in its position shown in FIG. 4, or is rotated in a clockwise direction as viewed in the figure, the relay coil RC is energized through the switch contacts 166, 167 at any time that the engine coolant temperature is below 115°. If, on the other hand, unheated air is to be provided to the passenger compartment of the vehicle, the switch S5 is rotated in a counterclockwise direction as viewed in FIG. 4 and the relay coil RC is not energized when the switch S2 is depressed regardless of engine coolant temperatures, since the contacts 166, 167 are no longer electrically connected by the copper circuit 118.

With the switch S2 closed and the engine coolant temperature sufficient to provide for opening of the switch S7 and de-energization of the relay coil RC, the passenger compartment of the vehicle is maintained at a preset desired temperature primarily by operation of the amplifier 60 as described above. If passenger compartment temperatures should decrease below the present desired temperature the blend door 15 is moved by operation of the servo-control means 25, the amplifier 60 and the associated valves 36, 37 to a position where a greater amount of heated air is supplied to the passenger compartment. Additionally, the copper circuit switch part 118 is rotated in a counterclockwise direction so that upon a predetermined amount of movement of the blend door, the speed of the blower motor M is increased automatically by operation of the switch S5.

When the copper circuit of the switch S5 has rotated counterclockwise an amount sufficient to bring the contact 168 into engagement with the printed circuit 118, the resistor R6 is effectively shunted from the motor circuit since energizing current for the blower motor is conducted through the junction 155 and directly from the contact 162 to the contact 168 through the copper circuit and around the resistor R2, through the junction 156 and through resistors R7–R9, junctions 160, 161, the motor M and to ground G. Further rotation of the switch S5 in a clockwise direction brings the contact 169 into engagement with the copper circuit 118 of the switch S5 to cause energizing current for the blower motor M to be shunted around the resistor R7 in the manner described in reference to the resistor R6.

With the contacts 162, 169 of the switch S5 closed, the blend door 15 is approximately at its limit position 15c wherein all of the air which is passed across the evaporator coils 12 is directed through the heater coil 13 and consequently the temperature of such reheated air is relatively high. Any further reduction in temperature in the passenger compartment of the vehicle results in further rotation of the copper circuit 118 of the switch S5 in a clockwise direction independently of blend door movement so that speed of the blower 14 is increased with the blend door 15 in its maximum heating position to effect a further increase in the volume of heated air supplied to the passenger compartment. Thus, as higher temperature air is required to heat the passenger compartment of the vehicle, the copper circuit 118 continues to rotate, bringing the stationary switch contacts 170, 171 successively into contact with the copper circuit portion of the switch S5 and thereby shunting energizing current for the blower motor M, around the resistors R8, R9. When the switch S5 is positioned so that the contacts 162, 171 are closed, an energization circuit for the motor M can be traced from the junction 155 through the contacts 162, 171, the junction 161 and directly through the blower motor M to the ground terminal G of the power supply. With the switch S5 in this last mentioned position, substantially all of the voltage across the energization circuit for the motor M drops across the low range resistor R5 and the blower motor M so that the blower motor M is operating at a maximum speed when the contacts of the low range switch S2 are closed.

It should additionally be noted that when the switch S5 is positioned to close the contacts 162, 169, the contact 162 and a contact 172 thereof are also closed so that an energization circuit for the solenoid coil 173 of the valve 35 is completed from the contact 162 through the contact 172, a junction 174, the solenoid coil 173 of the valve 35 and to ground. Energization of the solenoid coil 173 moves the air conditioning mode damper 28 associated with the vacuum motor 31 to its position illustrated in FIG. 2 wherein high temperature air being directed into the passenger compartment is directed along the floor thereof. A diode D1 adjacent the junction 174 isolates the energization circuit just described from other elements of the circuitry connected to the junction 174. Operation of the valve 35 is necessary to prevent high temperature air from being blown directly onto occupants of the vehicle.

When the low range blower speed switch S2 is depressed and a temperature in the vehicle passenger compartment is sensed which is higher than the preselected desired temperature, the servo-control unit 25 moves the blend door 15 toward its position 15b to provide for greater amounts of unreheated cooled air to enter the passenger compartment and with the servo-unit 25 also rotating the switch S5 in a counterclockwise direction as viewed in FIG. 4. It should be apparent from FIG. 4 that as greater amounts of cool air are required to maintain a preselected desired temperatures in the passenger compartment, the resistors R6, R7, R8, R9 are successively shunted from the energization circuit for the blower motor M so that the blower motor speed is increased as the switch S5 continues to be rotated in a counterclockwise direction and in this manner increased amounts of cooled air are provided to the passenger compartment.

Figure 2:
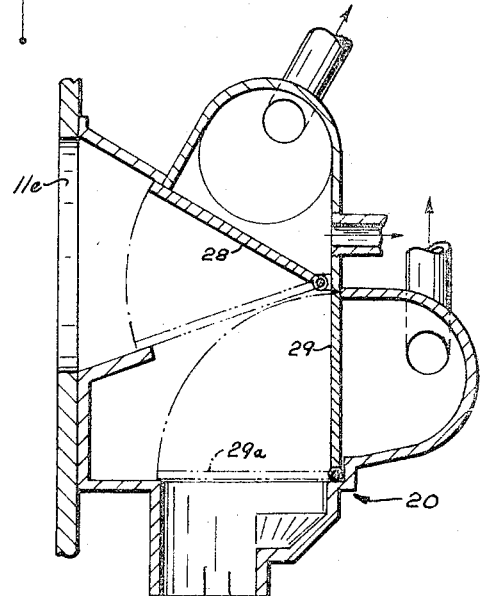
FIG. 2 is a sectional view on a larger scale of a portion of the system shown in FIG. 1 taken approximately at the line 2—2.

As the copper circuit 118 rotates counterclockwise the contacts 172, 165 thereof are successively disconnected from the copper circuit to successively de-energize the solenoid 173, 164 of the valves 25, 40, respectively. De-energization of the solenoid coil 173 effects movement of the damper 28 in the plenum chamber 20 to its dotted position as shown in FIG. 2 so that air from the duct means 11 is directed upwardly and into the passenger compartment. As the cooling load in the passenger compartment increases and the copper circuit continues to rotate in a counterclockwise direction the solenoid coil 164 is de-energized to move the fresh air damper 21 to its position shown in dotted lines in FIG. 1 so that air from the passenger compartment is recirculated through the duct means.

When the high blower speed range switch S3 is depressed, the contacts of the low range switch S2 are opened, as described, and contacts 70, 71 of the switch S3 are closed to maintain the amplifier 60 and servo-unit 25 operating as described hereinabove. Closing of the switch S3 also closes the contacts 70, 175 thereof to complete an energization circuit for the blower motor M from the terminal B+ through the ignition switch S1, junctions 62, 68, the contacts 70, 175, a junction 176, relay contacts RC–2 of the relay RC, the junction 157, the resistors R8, R9, junctions 160, 161, the motor M and to the ground terminal of the power supply.

It is apparent from the drawings that the above described energization circuit for the motor M is effective to drive the motor M at its lowest speed for the high range switch 53. As the copper circuit is rotated in either direction to successively close the contacts 169, 170, and 169, 171, the resistors R8, R9 are shunted out of the motor energizing circuit resulting in increasing speed of the motor. When the resistor R9 has been shunted out of the energization circuit, substantially all of the voltage in the circuit drops across the motor M and the motor is operated at its maximum speed.

Closing of the switch S3 additionally closes the contacts 70, 177 thereof to complete an energizing circuit for the relay coil RC from the power supply through the ignition switch S1, junctions 62, 68, contacts 70, 177, a junction 178, through the relay coil RC, contacts 166, 167 of the switch S5 and the closed contacts of the coolant temperature switch S7 to the terminal G of the power supply. It should be pointed out that the coolant temperature switch is normally open when the vehicle has been operated for any appreciable time and for this reason, the relay coil RC is normally de-energized. Operation of the relay coil RC with respect to the switch S3 is the same as described above in reference to the switch S2, so that further description of the cooperation between these elements is not necessary. It should be noted that the relay contacts RC2 are normally closed contacts which are open when the relay coil RC is energized and closed when the relay coil is de-energized. Preferably, the contacts RC1, RC2 are mechanically linked so as to open simultaneously when the coil RC is energized and closed together when the coil is de-energized.

If the windshield of the vehicle has become clouded due to an accumulation of condensed moisture on the inside thereof, the defrost or defog switch S4 is depressed, closing the contacts thereof and opening the contacts of the switch S3 or any other of the selector switches which were previously closed. Closing of the contacts 73, 74 of the switch S4 renders the amplifier 60 and servo-unit 25 operative as described above. Closing of the contacts 73, 180 of the switch S4 completes an energization circuit for the solenoid coil 164 of the valve 40 to effect opening of the damper 21 so that fresh air passes through the duct means 11. The energization circuit for the solenoid coil 164 can be traced from the terminal B+ of the power supply through the ignition switch S1, junctions 61, 68, a junction 181, contacts 73, 180 of the switch S4, a junction 182, a junction 183, through the solenoid coil 164 and to the ground terminal G of the power supply. Closing of the contacts 73, 180 additionally provides an energization circuit for the blower motor M which may be traced from the contacts 73, 180 through the junctions 182, 183 to the contact 165 of the switch S5, the contact 162 of the switch S5, through the resistors R6–R9, junctions 160, 161, the blower motor M and to the ground terminal G of the power supply. It will be appreciated that depending on the temprature conditions in the vehicle, this energization circuit for the blower may be altered to provide a higher blower speed depending on the angular position of the switch S5 relative to its contacts 167, 168, 170, 171 so that closing of the contacts 73, 180 may effect energization of the blower motor M at any speed thereof due to successive shunting of the resistors R6–R9 as described above. However, as will be come apparent, the blower motor M is energized by closing of the contacts 73, 180 only when engine coolant temperatures are below 115° F. and the relay coil RC is energized.

Closing of the switch S4 additionally closes contacts 73, 184 and 185 thereof. When the contacts 73, 184 are closed, a circuit is completed from the terminal B+ of the power supply through the contacts 73, 184, a junction 186, a junction 187, the solenoid coil 190 of the valve 41 and to the terminal G of the power supply. Energization of the solenoid coil 190 operates the valve 41 to provide vacuum to the vacuum motor 32 to effect movement of a damper 29 associated therewith to its position 29a, illustrated in FIG. 2, and directing of air from the plenum chamber into contact with the windshield of the vehicle. Closing of the contacts 73, 180 additionally completes an energizing circuit for the solenoid coil 173 of the valve 35 through the junctions 186, 187, a diode D1, the junction 174, the solenoid coil 173 of the valve 35 and to the ground terminal G of the power supply. Energization of the solenoid coil 173 maintains the damper 28 associated with the vacuum motor 31 in its position shown in FIG. 2 so as to insure directing of substantially all of the air from the duct means 11 along the windshield of the vehicle.

Closing of the contacts 173, 185 of the switch S4 completes an energization circuit for the blower motor M through the terminal B+ of the power supply through the contacts 73, 185, a junction 176, the relay contacts RC2 to the junction 157 and through the resistors R8, R9, junctions 160, 161, the blower motor M and to the ground terminal G of the power supply. Completion of this circuit provides for operation of the blower motor M in its high speed range as described in reference to the switch S3, and the speed of the blower motor M may be further increased as the switch S5 rotates in either a counterclockwise or clockwise direction.

If an accumulation of ice has formed on the windshield the de-ice switch S6 is depressed to close the contacts 192–195 thereof. Closing of the contacts 192, 193 completes an energizing circuit for the solenoid coil 164 of the valve 40 from the terminal B+ of the power supply through the ignition switch S1, junctions 61, 68, 181, the contacts 192, 193, the junctions 182, 183, the solenoid coil 164 of the valve 40, and to the ground terminal G of the power supply. With the solenoid coil 164 energized as described, the damper 21 associated with the vacuum motor 23 is moved to its position wherein fresh outside air enters the duct means 11.

Closing of the contacts 192, 194 of the switch S6 completes an energizing circuit for the solenoid coil 190 of the valve 41 and the solenoid coil 173 of the valve 35. The energizing circuits for the solenoid coil 190 can be traced from the terminal B+ of the power supply to the contacts 192, 194, junctions 186, 187, the solenoid coil 190, valve 41 and to the terminal G of the power supply. The energizing circuit for the solenoid coil 173 is established from the junction 187 through the diode D1, junction 174, the solenoid coil 173 and to the terminal G of the power supply. As noted above, energization of the solenoid coils of the valves 41, 35 effects directing of air from the plenum chamber 20 along the windshield of the vehicle.

Closing of the contacts 192, 195 of the switch S6 completes a blower motor energizing circuit from the terminal B+ of the power supply through the contacts 192, 195, a junction 196, the diode D2, the junction 161, the blower motor M, to the ground terminal G. It should be apparent that closing of the contacts 192, 195 provides for a maximum blower motor speed.

Closing of the contacts 192, 195 additionally provides an input signal to the amplifier 60 which is effective to cause de-energization of the solenoid coil 67 of the valve 37, associated with the vacuum motor 27 of the servo-unit 25 (see FIG. 6).

From the foregoing description of the servo-unit 25 it should be understood that de-energization of the solenoid coil 67 exposes the vacuum motor 27 to vacuum pressure and effects movement of the blend door 15 to its maximum heating position 15c. Due to the connection between the contacts 192, 195 and the solenoid coil 67 of the valve 37 it should further be apparent that the closing of the de-icing switch S-6 overrides the effect of the sensors R3, R4 in the input circuit of the amplifier 60 so as to provide maximum heating of the air directed along the windshield regardless of the temperature of air in the passenger compartment of the vehicle.

A temperature control system constructed in accordance with the present invention includes a control unit therefor which requires a minimum amount of space in the vehicle, is simply installed and removed therefrom, and is easily serviceable. In the illustrated embodiment the selector switch unit 150 may be of any suitable construction and is preferably installed in the dash panel (not shown) of the vehicle so as to provide easy accessibility to the selector switches by occupants of the vehicle. The control unit 151 is preferably located behind the dash panel and includes a housing 210 for enclosing and supporting the elements of the power unit described above. The housing 210 includes a box-like housing member 211 having a forward end 211a, as viewed in the drawings, and sides 211b, 211c integrally formed with the end 211a to provide a generally rectangular structure which is open at its end 211d, and a cover plate 215 which is adapted to form a closure for the open end 211d of the housing member 211 and which is secured to the housing member by suitable screws 216. The cover plate 215 additionally includes apertures 217 therein to permit mounting of the assembled power unit 151 in a suitable location behind the dash panel.

The interior of the housing member 211 is separated into compartments 218a, 218b, 218c by partition members 219a, 219b which are positioned within the housing member 211 and connected to inner walls thereof. The partition member 219a is a two part member connected to the interior of the forward end 211a and to the interior surfaces of the sides 211b of the housing member 211 and which extends in a vertical plane to the open end 211d of the housing member 211. The partition member 219b is connected between the partition member 219a and the right hand side 211c of the member 211, as viewed in FIG. 14.

Figure 13:
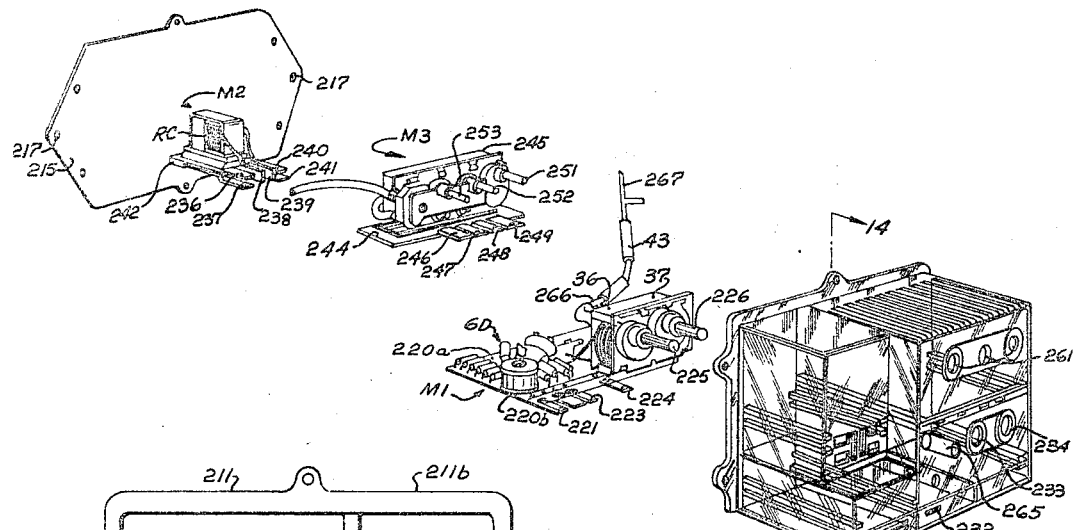
FIG. 13 is an exploded view of the apparatus of FIG. 12.

The elements of the power unit 151 are organized into three modules M1, M2, M3 which are individually serviceable or replaced with a minimum number of vacuum and electrical connections being broken and reconnected. As best illustrated in FIG. 13, the module M1 comprises elements of the amplifier 60 (except the input circuit elements R1–R4 referred to above), and the servo-control valves 36, 37. The amplifier 60 and the valves 36, 37 are mounted on a circuit board 220a constructed of a suitable material, such as a phenolic plastic, with the external connections for the amplifier 60 in the form of terminal bars 221–224 which extend from the forward side of a terminal board 22a as viewed in the drawings. The outlet ports of the valve 36, 37 are associated with tubular connectors 225, 226 which extend from the forward side of the terminal board 220a parallel to the terminal bars 221–224. The module M1 is inserted into the housing 210 by sliding edges 220b of the terminal board 220a into channels 230 integrally formed in the sides 211c of the housing member 211 and which channels extend horizontally from the forward end 211a thereof to the open end 211d. The terminal board 220a is also supported within the housing member 211 by the lower part 228 of the partition member 219a, as viewed in the drawings, and a rectangular support member 229 fixed on the lower side 211b of the member 211 in the compartment 218a. The module M1 is inserted into the housing member 211 with the terminal bars 221–224 and the connectors 225, 226 extending forwardly of the housing member 211 as shown in FIG. 13.

When the module M1 has been inserted in the housing member 211, as described, the terminal bars 221–223 extend through a slot-like opening 231 formed in the end 211a of the housing member 211, while the terminal bar 224 extends through a slot-like opening 232 in the end 211a. The connectors 225, 226 extend through openings 233, 234, respectively in the side 211a.

Figure 14:
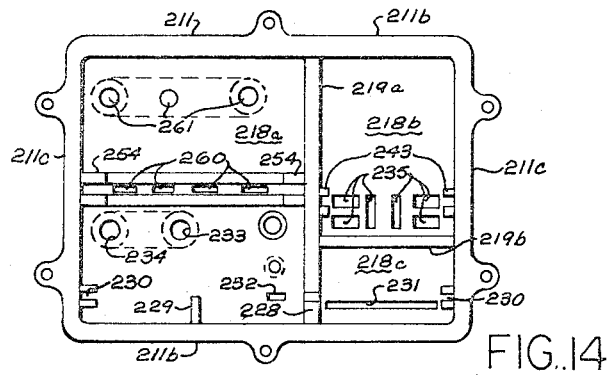
FIG. 14 is a view of the apparatus of FIG. 13, taken approximately at the line 14—14 of FIG. 13.

The module M2 includes the relay coil RC and its associated contacts RC1, RC2, and the terminal bars 236, 237, 238, 239, 240, 241, for connecting the contacts and relay coil to the circuitry associated therewith, described above. As illustrated, the relay coil RC and contacts RC1, RC2 are mounted on a circuit board, or similar type of board, 242, to which the terminal bars 236–241 are connected. The module M2 is inserted into the compartment 218b of the housing member 211 and is supported therein by channels 243 into which the edges of the board 242 are slid. The left hand channel 243, as viewed in FIG. 14, is attached to the partition member 219a and the other channel is attached to the side 211c of the housing member, with both channels extending horizontally along the sides of the compartment 218b and opening at the end 211d of the housing member. When the board is inserted into the channel 243 the terminal bars 236–241 extend through apertures 235 at the forward end of the compartment for connection in the circuitry described previously.

The module M3 includes the valves 35, 40, 41, which are integrally constructed and which are connected to a board 244 by a frame member 245. The solenoid coils 164, 173, 190 are connected to four terminal bars 246–249 which are suitably attached to the board 244 and which terminal bars are adapted to connect the solenoids into the circuitry of FIG. 4 as described. The outlet ports of the valves 35, 40, 41 are associated with tubular connectors 251, 252, 253, respectively, and which co-extend from the valve structure parallel to the terminal bars 246–249. The module M3 is inserted into the compartment 218a of the housing member 211 by sliding the terminal board 244 into channels 254 which are attached to the partition member 219a and the left side 211b (as viewed in FIG. 14) of the housing member 211, and which channels extend horizontally between the ends 211a, 211d of the housing member 211 as described in reference to the channels 230, 243. The terminal bars 246–249 and the outlet connectors for the valves 35, 40, 41, of the module M3 extend through a plurality of suitably located openings generally designated 260, 261 respectively which are provided in the forward end 211a of the housing member 211.

The forward end 211a of the housing member 211 additionally includes a suitable vacuum fitting 265 for connection with the vacuum line V6 from the vacuum supply in the vehicle engine. The fitting 265 is associated with the vacuum line 44 and which vacuum line includes suitably constructed T joints 266, 267 for connection with the valves 36, 37 and the manifold 43 for the valves 35, 40, 41, respectively. The vacuum line 44 is separable so that the modules can be installed in the housing member 211, as described, prior to connection to the vacuum source, and with the modules M1, M3 being individually separable from the line 44 for maintenance or replacement. With the modules M1–3 installed and supported in the housing member 211 as described, the cover plate 215 is connected to the housing member across the open end 211d thereof. Preferably a thin sheet of foam material is interposed between the cover plate 215 and the housing member 211 to aid in maintaining the modules against movement therein and to dampen vibrations which are apt to be transmitted from the cover plate 215 supported in the vehicle to the elements of the modules 220–222 after the unit 210 has been installed in the vehicle.

It should be apparent that by disconnecting the fluid and electrical connections external to the housing member 211, the entire unit 151 can be removed from the vehicle for maintenance purposes. More over, individual ones of the modules M1–3 are removable from the housing member 211 without need of breaking any internal electrical connection and by disconnecting, at most, a single internal vacuum connection. Since the elements of the individual modules are removably connected to their respective circuit boards, replacement or repair of such elements is effected without disturbing either vacuum or electrical connections in any of the other modules, and of course, can be performed in a suitable location remote from the vehicle. Additionally, the reduction in the amount of internal wiring utilized in the unit 151 and internal vacuum hoses and associated connections results in a substantial savings in material costs, cost of manufacture and production time, as well as the aforementioned savings resulting from simplified servicing of the unit.

It can now be seen that the objects heretofore enumerated and others have been accomplished and that there has been provided a new and improved air temperature control system. While the single embodiment of the system embodying the present invention has been illustrated and described herein in considerable detail, the present invention is not to be considered to be limited to the precise construction shown, but rather it is my intention to cover hereby all adaptations, modifications and uses of the invention which come within the scope of the appended claims.

Having described my invention, I claim:

1. A temperature control system for conditioning an air space and comprising an air heating structure, air cooling structure, ducting for directing air past the heating and cooling structures and to the air space, a member movable to change the heat transfer between one of said structures and said air, said member being movable between a first position wherein air entering said air space from said ducting is at a relatively low temperature and a second position wherein air entering said air space from said ducting is at a relatively higher temperature, actuating means for moving said member between said positions and for positioning said member in any position between said positions, said actuating means including first and second fluid pressure operated motors drivingly connected to said member, said first motor operable in response to differential fluid pressure applied thereto to move said member toward one of said positions, said second motor operable in response to differential fluid pressure to move said member toward said other position, control means governing the application of fluid pressure to said motors including valve means associated with said first and second fluid motors and connected between said motors and a source of fluid at operating pressure, said valve means operable between a first condition wherein a differential fluid pressure is applied to one of said motors to move said member in one of said directions, a second condition wherein said first and second motors are exposed to identical fluid pressures and a third condition wherein said other motor is exposed to a differential fluid pressure to move said member in the other direction, said movable member being stationary when said valve means is operated to said second condition so that the air entering said space is at a temperature determined by the position of said member, and means for operating said valve means between said conditions in response to sensed air temperatures in said air space.

2. A temperature control system as defined in claim 1 wherein said movable member is a vane-like member disposed in said ducting and operable in its first position to divert said air from said heating structure and in its said second position to direct air to said heating structure.

3. A temperature control system as defined in claim 1 and further including dampers in said ducting for changing the flow path of air therethrough, fluid operated motor means for operating said dampers, second valve means for controlling operation of said motor means, said first and second valve means spaced from said respective motors and motor means and forming first and second modular assemblies, respectively, said assemblies individually removably supported by housing means and having fluid connections to said source of fluid and to said motors and motor means externally of said housing means.

4. A temperature control system as defined in claim 3 wherein said means for operating said first valve means between said conditions includes electrically energized actuating means and with said actuating means constructed integrally with said first modular assembly.

5. A temperature control system as defined in claim 4 wherein said first valve means includes first and second valves cooperable with said first and second fluid motors respectively, and said actuating means includes first and second solenoid coils individually energizable to control operation of said valves and said motors, and further including amplifier means having a temperature responsive input circuit, amplifier circuitry, and output circuits, said output circuits connected to said solenoid coils, said amplifier circuitry and said output circuits constructed integrally with said first assembly and with the electrical power and input circuit connections for said amplifier circuit extending externally of said housing means.

6. A temperature control system as defined in claim 1 and further including blower means in said ducting including an electrically energized motor connectable to a source of electrical power through a switch means and wherein said switch means includes a plurality of contacts and a conductor, said first and second fluid motors operable to effect relative movement between said conductor and said contacts whereby the speed of said blower motor is varied as said member is moved by said actuating means.

7. A temperature control system as defined in claim 6 wherein said ducting further includes dampers for controlling the flow of air therein and pressure operated motor means associated with said dampers to effect movement thereof, electrically energized valve means connectable to said source of electrical power through said switch means and with relative movement between said conductor and said contacts effective to energize said electrically energized valve means for effecting movement of said dampers in response to operation of said first and second fluid motors.

8. A temperature control system as defined in claim 7 wherein said conductor of said switch means includes a sheet of conductive material attached to a rotatable disc member and with said rotatable disc member drivingly connected to said first and second fluid motors whereby said disc member is rotated in response to operation of said motors.

9. A temperature control system as defined in claim 2 wherein said vane-like member is supported for pivotal movement in said ducting and said actuating means further includes a base member for supporting said first and second motors in fixed relation to said ducting, each of said motors including a part which is freely movable in response to differential pressure acting thereon, and means for drivingly connecting said parts to said vane-like member.

10. A temperature control system for conditioning an air space and comprising air heating means, air cooling means, duct means for directing air past the heating and cooling means and to the air space, a member movable to change the heat transfer between one of said air heating and air cooling means and said air between a first position wherein air entering said air space from said duct means is at a relatively low temperature and a second position wherein air entering said air space from said duct means is at a relatively higher temperature, actuating means for moving said member between said positions and for positioning said member in any position between said positions, said actuating means including first and second fluid pressure operated motors drivingly connected to said member, said first motor operable in response to fluid pressure applied thereto to move said member toward one of said positions and said second motor operable to move said member toward said other position, and means for controlling the application of fluid pressure to said motors including valve means associated with said first and second fluid motors and connected between said motors and a source of fluid at operating pressure, said valve means operable between a first condition wherein fluid pressure is applied to one of said motors to move said member in one of said directions, a second condition wherein said first and second motors are isolated from said source of fluid pressure and third condition wherein said other motor is exposed to fluid pressure to move said member in the other direction, and means for operating said valve means between said conditions in response to sensed air temperatures in said air space, said movable member being a vane-like member disposed in said duct means and operable in its first position to divert said air from said heating means and in its second position to direct air to said heating means, said vane-like member is supported for pivotal movement in said duct means and said actuating means further including a base member for supporting said first and second motors in a fixed relation to said duct means, each of said motors including a part which is freely movable in response to differential pressure acting thereon, and means for drivingly connecting said parts to said vane-like member, said means for drivingly connecting said parts of said motors to said vane-like member including first and second members connected to said parts, a first drive member connected to said first and second members for movement in response to movement of one of said parts and drivingly connected to said vane-like member, and friction means for retardign movement of said drive member by said parts of said motors.

11. A temperature control system as defined in claim 10 wherein said friction means includes a friction member having a surface engaged with said drive member and with the static coefficient of friction therebetween being substantially equal to the dynamic coefficient of friction therebetween.

12. A temperature control system as defined in claim 11 wherein said friction means further includes biasing means for urging said driving member into engagement with said friction member.

13. A temperature control system as defined in claim 12 wherein said friction means further includes means for permitting adjustment of the force of said biasing means.

14. A temperature control system as defined in claim 1 wherein said first and second motors include resiliently flexible diaphragms connected to said member, each of said diaphragms exposed at one side to atmospheric pressure and with an opposite side thereof forming a wall of a chamber, said valve means effective to provide a vacuum fluid pressure in one of said chambers to effect movement of said diaphragm forming a wall thereof toward said chamber, and wherein said diaphragm is maintained in a position to which it has been moved by said vacuum pressure after said valve means exposes said chamber to atmospheric pressure.

15. An automotive air tempering system having duct means for conveying air to a passenger compartment of the vehicle, heat exchanger means in said duct means, blower means in said duct means including an electric motor connectable to a source of electric power and operable to direct air past said heat exchanger means, rotary switch means connected between said blower means and said power source for controlling the speed of said electric motor, said rotary switch means including fixed and movable conductor means, actuating means including first and second fluid pressure operated motors for effecting movement of said movable conductor means in response to temperature changes in the passenger compartment, one of said fixed and movable conductor means comprising spaced conductors connected to said motor of said blower means and said other of said conductor means including a conductor member connected to said power source and positioned to successively engage individual ones of said conductors upon relative rotation therebetween in one direction, and resistance element connected between said conductors, said conductor member and said conductors being moved relative to each other by said actuating means to successively engage individual ones of said conductors and said conductor member to shunt energizing current around successive ones of said resistance elements thereby increasing the speed of said blower motor, said movable one of said conductor means connected to a driving member rotatably movable by said actuating means and supported for movement relative to a stationary base member and further including friction means for resisting relative movement between said driving member and said base member and providing a static coefficient of friction between said driving and base members which is substantially the same as the dynamic coefficient of friction therebetween.

16. An automotive air tempering system as defined in claim 15 wherein said friction means includes spring means for urging said driving member toward said base member, and means for permitting adjustment of the force of said spring means.

17. An automotive air tempering system as defined in claim 15 wherein said duct means includes a plurality of dampers therein movable to change the flow path of air therein, fluid operated motors drivingly connected to said dampers, valve means operable to expose said motors to a differential fluid pressure to effect operation thereof and movement of individual ones of said dampers, and electrically energized actuating means for operating said valve means, said actuating means associated with one of said fixed and movable conductor means of said switch means and with relative movement between said fixed and movable conductor means operable to control energization of said electrically energized actuating means.

18. An automotive air tempering system as defined in claim 17 wherein said valve means and said electrically energized actuating means form a modular assembly positioned remote from said switch means, said assembly removably supported by housing means and with electrical and fluid connections between said assembly and said switch means and dampers external of said housing means.

19. An automotive air tempering system as defined in claim 13 wherein said fluid motors of said actuating means are operated in response to differential fluid pressure acting thereon to effect relative movement between said fixed and movable conductor means, and further including means for controlling operation of said first and second motors in response to sensed air temperature in the passenger compartment, said control means including valve means operable to control application of said differential pressure to said motors, electrically energized actuating means for effecting operation of said valve means, and amplifier means for controlling energization of said electrically energized actuating means.

20. An automotive air tempering system as defined in claim 19 wherein said amplifier means includes amplifier circuitry, output circuits connected to said electrically energized actuating means, and an input circuit, said input circuit including circuit elements located remote from said amplifier circuit, and wherein said control means for said motors comprises a modular assembly including said valve means, said electrically energized actuating means, said amplifier circuitry, and said output circuits, said assembly removably supported by housing means and with electrical and fluid connections to said assembly being external of said housing means.

21. An air tempering system for an automotive vehicle including air tempering means, ducting for directing air past said tempering means, at least a movable member governing tempering of air in said ducting, movable elements controlling the flow of air in said ducting, pressure operated actuating means for operating said movable member and said elements individually, and a modularized control unit connected in said system comprising a box-like housing having an open side and a plurality of openings in the wall opposite said open side, support means in said housing for slidably receiving first, second and third plates inserted through said open side and supporting said plates in said housing, a first module including a first support plate, and electrically operated valve means attached to said first plate and having fluid connectors projecting beyond one edge of said first plate and adapted to extend through certain of said openings in said wall when said first plate is in said housing for connection with actuating means for said movable member and electrical terminals supported on said first plate and extending beyond said one edge and through certain other of said openings in said wall for connection with an electric power supply, a second module including a second plate adapted to be supported in said housing by said support means and having attached thereto second electrically operated valve means controlling operation of actuating means for said elements and including fluid connectors projecting beyond one edge of said second plate and adapted to extend through certain other of said openings in said wall for connection to said actuating means for said elements, and a third support plate adapted to be supported in said housing by said support means, and electrically operated switch means attached to said third plate and including terminal members projecting beyond one edge of said third plate and adapted to extend through certain other of said openings in said wall.

References Cited
UNITED STATES PATENTS

| | | | |
|---|---|---|---|
| 2,997,240 | 8/1961 | Kreuttner | 236—13 |
| 3,263,739 | 8/1966 | Gaskill et al. | 165—23 |
| 3,315,730 | 4/1967 | Weaver et al. | 165—23 |

FRED C. MATTERN, JR., *Primary Examiner.*

MANUEL ANTONAKAS, *Assistant Examiner.*

U.S. Cl. X.R.

236—13, 84